United States Patent [19]
Israel et al.

[11] Patent Number: 5,834,040
[45] Date of Patent: Nov. 10, 1998

[54] EXTRUDER FOR MAKING BRAIDED PRODUCTS

[75] Inventors: Gary E. Israel, West Nyack, N.Y.; John Knapp, Sicklerville; Mark Foley, Blackwood, both of N.J.

[73] Assignee: Pepperidge Farm, Incorporated, Norwalk, Conn.

[21] Appl. No.: 476,402

[22] Filed: Jun. 7, 1995

[51] Int. Cl.⁶ .................................................. B29C 43/30
[52] U.S. Cl. ...................... 425/381; 425/382.3; 425/464; 426/499
[58] Field of Search ................................ 425/323, 382.3, 425/464, 190, 319, 381, 132, 391; 264/DIG. 81; 426/499, 500, 516, 501; 18/8

[56] References Cited

U.S. PATENT DOCUMENTS

| | | | |
|---|---|---|---|
| 2,361,709 | 10/1944 | Roelen | 18/8 |
| 2,856,868 | 10/1958 | Kennedy . | |
| 3,632,714 | 1/1972 | Fairbanks | 264/103 |
| 3,689,617 | 9/1972 | Fairbanks | 264/103 |
| 3,876,743 | 4/1975 | Soderlund et al. . | |
| 4,334,845 | 6/1982 | Tamminen . | |
| 4,445,835 | 5/1984 | Wasserbach . | |
| 4,504,511 | 3/1985 | Binley . | |
| 4,925,380 | 5/1990 | Meisner . | |
| 5,110,276 | 5/1992 | Farnsworth et al. . | |
| 5,460,079 | 10/1995 | Bartow et al. . | |

*Primary Examiner*—Patrick Ryan
*Assistant Examiner*—Iurie A. Schwartz
*Attorney, Agent, or Firm*—Banner & Witcoff, Ltd.

[57] ABSTRACT

A braiding extruder for making braided products from extrusible material. The braiding extruder includes a first rotatable member, a second rotatable member, a rotatable member driving system, and an orifice blocking arrangement. The rotatable members each include a pair of orifices for extruding a strands of extrusible material therethrough. The orifices are fluidly coupled to a source of pressurized extrusible material. The driving system rotates the first rotatable member clockwise about a first axis of rotation, and rotates the second rotatable member counter-clockwise about a second axis of rotation, parallel to the first axis of rotation. The orifice blocking arrangement selectively permits and prevents the extrusion of the extrusible material from the orifices. The orifices, the driving system, and the orifice blocking arrangement extrude and braid at least three strands of extrusible material. The braiding extruder forms a visually attractive product which reaps the benefits of the "hand made" appeal normally associated with braiding.

26 Claims, 8 Drawing Sheets

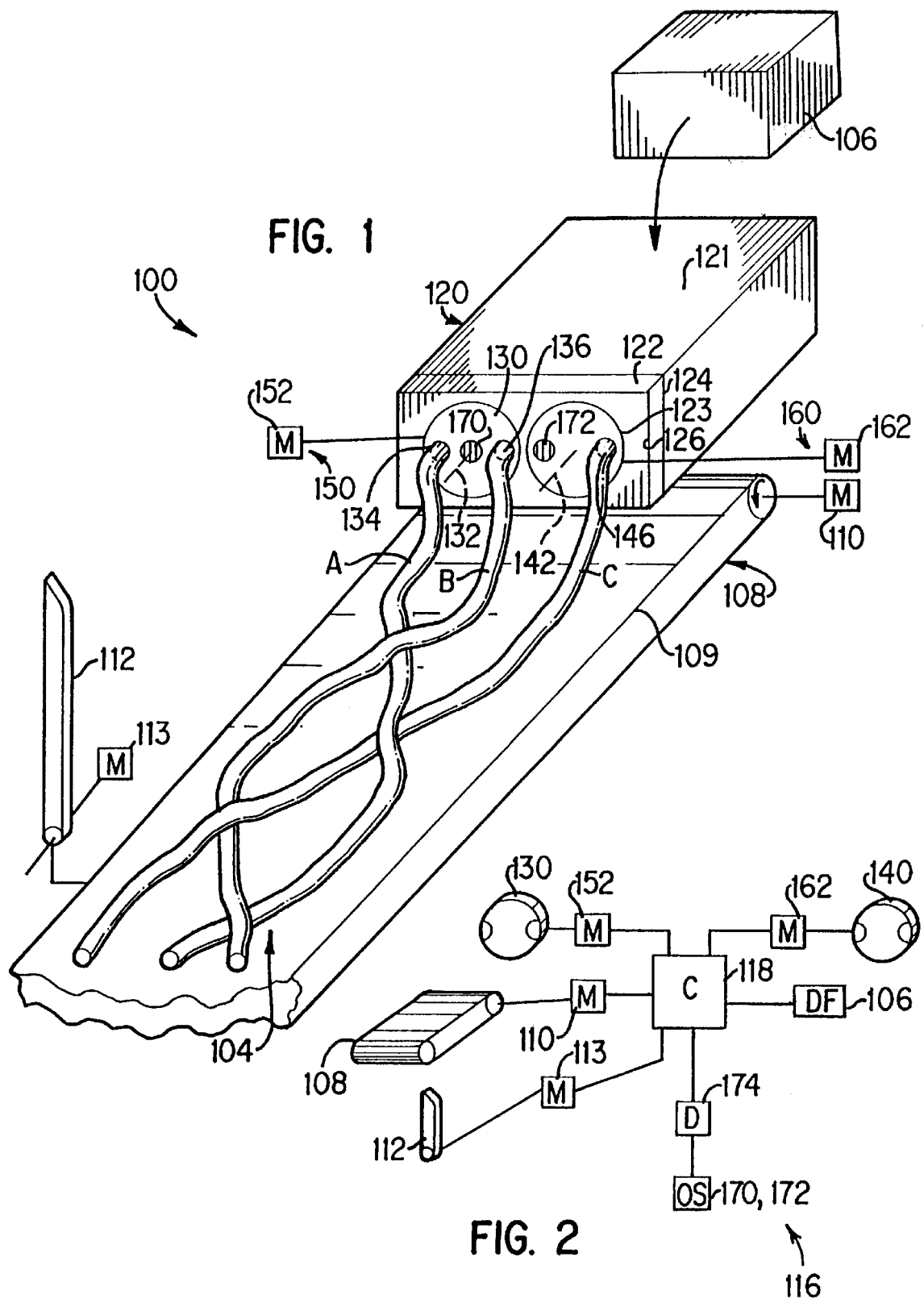

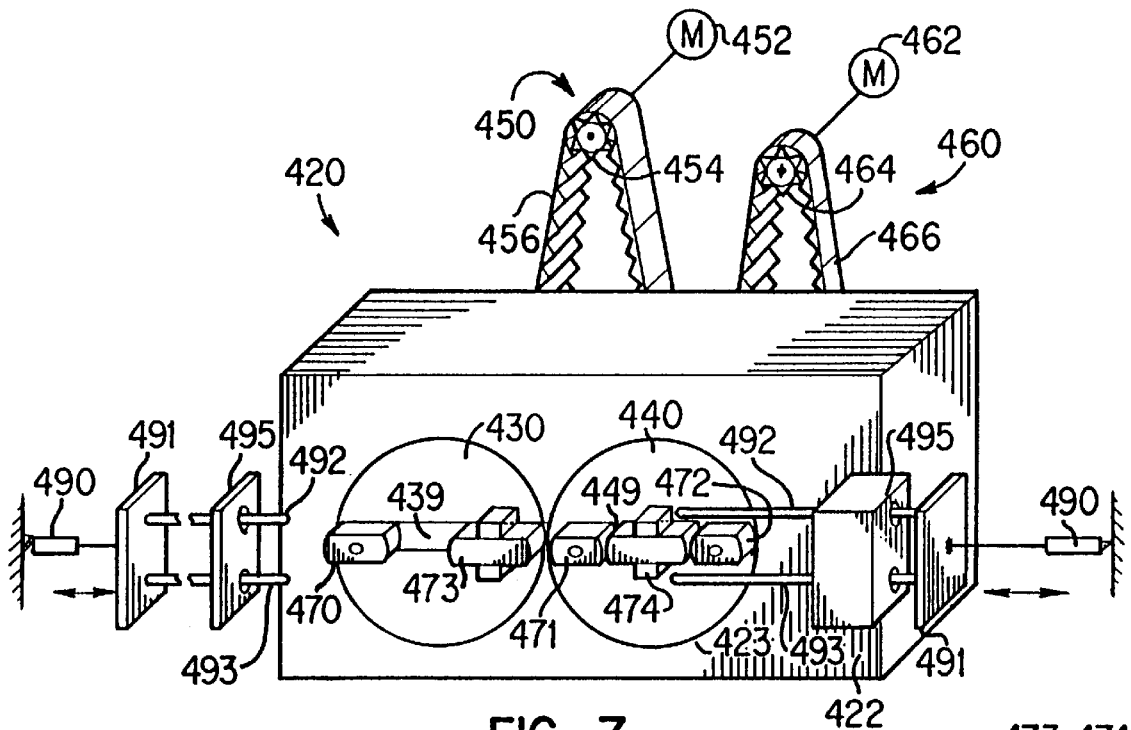
FIG. 7
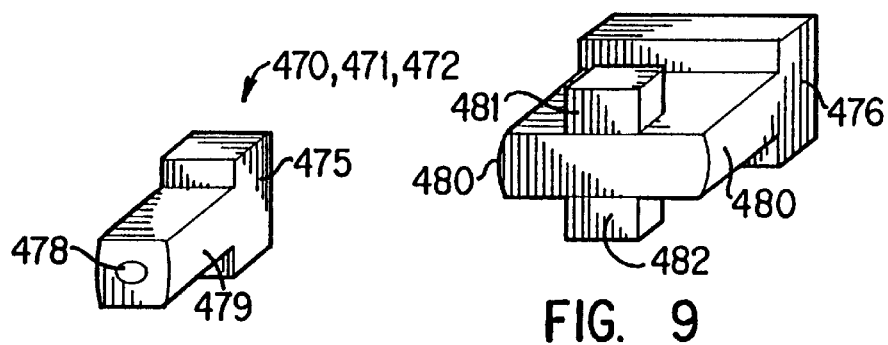
FIG. 8
FIG. 9

EXTRUDER FOR MAKING BRAIDED PRODUCTS

FIELD OF THE INVENTION

The present invention relates to an extruder for making braided products. More specifically, the present invention relates to an extruder which extrudes and braids thick batters, flowable doughs, confections, and other viscous extrusible substances.

BACKGROUND OF THE INVENTION

Confections and other food products are frequently more appealing when they are formed from a plurality of interrelated strands. Extruders are used for making confections having a plurality of strands. These extruders form products having interrelated twisted strands and variations of interrelated twisted strands. However, these extruders are unable to form braided products, which are more appealing to many consumers. Further, hand-made braided products are expensive and time consuming to manufacture.

U.S. Pat. No. 4,334,845 to Tamminen discloses an apparatus and a method for producing bakery rolls. Two separate bars of dough enter and are ejected from separate oppositely rotating angled nozzles to form side-by-side interlocked spiraled strands. The side-by-side interlocked spiraled strands form what is described as a continuous roll bearing a great resemblance to a braided roll of dough. However, it is apparent that such a roll is not braided.

Other extruders are known for forming food products which have twisted strands taking the form of a traditional twisted configuration or a variety thereof. U.S. Pat. No. 2,856,868 to Kennedy describes a method and apparatus for kneading and twisting bread dough, including rotating two nozzles operatively connected to a common header to form the twist. U.S. Pat. No. 3,876,743 to Soderlund discloses a method and apparatus for producing a product having a helical twisted configuration without rotating the nozzles. Additionally, U.S. Pat. No. 4,504,511 to Binley discloses a method and apparatus for producing products with spirally-formed extrusible materials, including the step of rotating a nozzle body with adjacent nozzles about a central axis to form a coil shape.

SUMMARY OF THE INVENTION

In view of the foregoing, it is a principal object of the present invention to provide an extruder which braids strands of material extruded therethrough.

It is a further object of the invention to provide an apparatus which automatically weaves batters, flowable doughs, and other viscous extrusible materials into a three strand braid.

It is another object of the invention to provide an apparatus for forming a visually attractive product which reaps the benefits of the "hand made" appeal normally associated with braiding.

More specifically, it is an object of the invention to provide a device which extrudes a strand from a first movable die member and transfers the strand to a second die member independently movable with respect to the first die member.

Another object is to provide an extruder with a plurality of outlet ports and valves for selectively controlling the extrusion of material through the outlet ports. The valves are controlled to produce a product having interwoven strands.

It is yet another object of the invention to provide an apparatus which simultaneously extrudes and braids strands of extrusible material. If the extrusible material is a dough, a batter, or the like, the braided product can be subsequently cooked.

These and other objects are achieved by the present invention which, according to one aspect, provides an apparatus for making braided products from extrusible material. The apparatus includes a first rotatable member, a second rotatable member, a rotatable member driving system, and an orifice blocking arrangement. The rotatable members each include a pair of orifices for extruding a strands of extrusible material therethrough. The orifices are fluidly coupled to a source of pressurized extrusible material. The driving system rotates the first rotatable member clockwise about a first axis of rotation, and rotates the second rotatable member counter-clockwise about a second axis of rotation, parallel to the first axis of rotation. The orifice blocking arrangement selectively permits and prevents the extrusion of the extrusible material from the orifices. The orifices, the driving system, and the orifice blocking arrangement extrude and braid at least three strands of extrusible material.

In yet another aspect, the invention provides an apparatus for making a product with at least one strand from an extrusible material. The apparatus includes a controller, a first valve, a second valve, a first rotatable member and a second rotatable member. Each rotatable member includes at least one passageway, and is rotatable around a respective axis of rotation. The first and second valves are each located on a respective rotatable member, and each valve has an open condition in which the extrusible material is extruded in a strand through the passageway on its respective rotatable member, and a closed condition in which the extrusible material is prevented from being extruded through the passageway on its respective rotatable member. The controller closes the first valve and opens the second valve, causing a strand being extruded through the passageway on the first rotatable member to be transferred to the passageway on the second rotatable member for continued extrusion thereof.

In another aspect, the invention provides an apparatus for making a braided product from extrusible material. The apparatus including four outlet ports fluidly coupled to a source of pressurized extrusible material. The outlet ports are selectively opened and closed for extruding exactly three strands of the extrusible material therethrough. A mechanism moves the three strands in a substantially figure-eight-shaped pattern to braid the strands.

These and other objects and features of the invention will be apparent upon consideration of the following detailed description of preferred embodiments thereof, presented in connection with the following drawings in which like reference numerals identify like elements throughout.

BRIEF DESCRIPTION OF THE DRAWINGS

FIG. 1 is a schematic view of the braiding product extruder system of the present invention.

FIG. 2 is a schematic diagram depicting the extruder control system.

FIG. 7 is a discharge-side perspective view of a third braiding extruder embodiment of the present invention.

FIG. 8 is a perspective view of a movable discharge nozzle used in the braiding extruder of FIG. 7.

FIG. 9 is a perspective view of a movable push block used in the braiding extruder of FIG. 7.

DETAILED DESCRIPTION OF THE PREFERRED EMBODIMENT

Figure 3A:
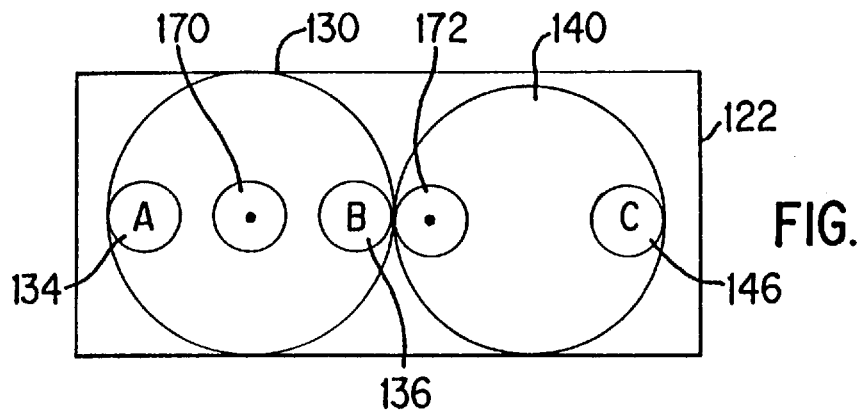
FIGS. 3a–3l are sequential schematic front views of the extruder illustrating the operation of the rotatable plates and the orifice blocking members to form a braided product in accordance with the invention.

With reference to the terminology employed herein, it is to be understood that in referring to multi-stranded products, a "braided product" is defined as a product having three or more strands and is formed by repeatedly crossing a left and then a right strand over a central strand and under an opposite strand.

A braiding extruder system of the present invention is pictured in FIGS. 1–10, and is designated generally by reference numeral 100. Specifically referring to FIG. 1, braiding extruder system 100 includes a braiding extruder 120 which extrudes and manipulates three individual strands A, B, and C of extrusible material to form a braided product 104. While an unlimited variety of different extrusible materials can be used with extruder system 100 to form different products, food dough is particularly desirable extrusible material to form braided pastries and breads. Hereinafter, the extrusible material used in extruder system 100 is referred to as "dough" for the purposes of providing a simplified description only.

A pressurized dough feeder 106 supplies pressurized dough, into an extrusion manifold 121 of extruder 100. An extrusion block 122 located at or adjacent the front of extruder 120 includes a cut-out figure-eight section 123 which accommodates first and second rotatable circular extrusion die members 130 and 140 for rotation about a respective axis 132 and 142 substantially perpendicular to the plane of the front of the members 130 and 140. First and second rotational members 130 and 140 each include a pair of generally circular orifices 134 and 136, and 144 and 146, respectively which are located adjacent the annular periphery of the rotatable members, and offset 180° from the other orifice on its rotatable member. The dough flows from the supply side 124 of the rotational members to the discharge side 126, via three of the four orifices 134, 136, 144, and 146, to form strands A, B, and C.

Each rotational member 130 and 140 is coupled to a respective driving system 150 and 160, preferably having a drive motor 152 and 162, for turning members 130 and 140 about their respective axis 132 and 142, and in opposite directions from one another. As described hereinafter with reference to FIG. 2, drive motors 152 and 162 are preferably coupled to a common control system for coordinating the rotation of members 130 and 140. It is recognized that a single reversible drive motor with a clutching arrangement could be used in lieu of utilizing two separate drive motors.

One or more blocking members, e.g., two orifice seals 170 and 172, can selectively block orifices 134, 136, 144, 146 so that three strands A, B, and C are extruded from the four orifices. Orifice seals 170 and 172 are each moved between a position which blocks an orifices a position which does not obstruct the orifices by an orifice seal driving system 174. Orifice seals 170 and 172 and orifice driving system 174 are schematically illustrated in FIGS. 1 and 2, and can be implemented by various different arrangements.

The dough is continuously extruded from extruder 120 so that the dough exits three of the four orifices in strands A, B, and C, and is deposited onto a collection conveyor 108. Collection conveyor 108 is a conventional conveying device and preferably includes a belt 109 with an upper run supporting the braided strands A, B, and C, and a motor 110 for moving the upper run to convey the "just extruded" portions of the braided strands away from extruder 120. A guillotine, flying knives, or other cutting device, schematically illustrated by reference numeral 112, is preferably placed adjacent conveyor 108, downstream from extruder 120, to cut the extruded braid into desired lengths. A motor 113 is preferably coupled to cutting device 112 for the automated operation thereof.

FIG. 2 depicts the extruder system control 116 which includes a process linked controller 118, which may be of the generic type, which is coupled to (i) pressurized dough feeder 106 and/or a pressurizer inside manifold 121, (ii) cutting motor 113, (iii) belt motor 110, (iv and v) rotatable member motors 152 and 162, and (vi) the driving system for orifice seals 174, to respectively control and synchronize (i) the dough extrusion speed, (ii) the cutting frequency of knife device 112, (iii) the belt speed, (iv and v) the rotation of circular members 130 and 140, and (vi) the movement of orifice seals 170 and 172. Accordingly, controller 116 is used to properly maintain the internal extrusion pressure to balance the extrusion speed, and the rotational speed of the circular members 130 and 140, to assure that the desired braid formation is achieved and held constant. Additionally, variations of braid dimensions, frequency and wavelength are also achievable.

Controller 118 can be of any conventional type used in other manufacturing control system applications, e.g., a program and a computer, to achieve the desired operational control. It is preferable that a keyboard of other manual interface, not shown, is coupled to controller 118 so the operation of any or all of the controlled devices can be modified. Further, control system 116 can include one or more sensors, not shown, which monitor various parameters and input the results to controller 118, to automatically adjust or terminate the operation of any or all of the controlled devices in accordance with its program.

The operation of extruder 120 is now described in conjunction with sequential FIGS. 3a–3l. It will be apparent that the braid formation of product 104 is created by alternately rotating die members 130 and 140 in 180° increments in opposite directions, combined with shifting the orifice seals 170 and 172 to selectively block designated orifices. Throughout the operation, only three orifices are open allowing passage of dough therethrough, with the exception of when the orifice seals are shifted, and one orifice is closed as an opposing orifice opens. To facilitate the explanation of the braiding process, reference may be made to the chart below.

|  |  |  | Strand Position | | | |
|---|---|---|---|---|---|---|
|  |  |  | Left Member 130 | | Right Member 140 | |
|  |  |  | Orifice No.--> | | | |
| Fig. No. | Seq. No. | Operation | 134 | 136 | 144 | 146 |
| 3a | 1 | Start | A | B | — | C |
| 3b | 2 | Rotate left member | B | A | — | C |
| 3c | 2a | Shift braid right | B | — | A | C |
| 3d | 3 | Rotate right member | B | — | C | A |
| 3e | 3a | Shift braid left | B | C | — | A |
| 3f | 4 | Rotate left member | C | B | — | A |

-continued

| | | | Strand Position | | | |
|---|---|---|---|---|---|---|
| | | | Left Member 130 | | Right Member 140 | |
| | | | Orifice No.--> | | | |
| Fig. No. | Seq. No. | Operation | 134 | 136 | 144 | 146 |
| 3g | 4a | Shift braid right | C | — | B | A |
| 3h | 5 | Rotate right member | C | — | A | B |
| 3i | 6 | Shift braid left | C | A | — | B |
| 3j | 6a | Rotate left member | A | C | — | B |
| 3k | 7 | Shift braid right | A | — | C | B |
| 3l | 8 | Rotate right member | A | — | B | C |

FIG. 3a illustrates sequence no. 1, which is a starting or reference position for extruder 120. Left rotational member 130 is in a position where orifice 134 is on the left, i.e., at 180°, and orifice 136 is on the right, i.e., at 0°. Right rotational member 140 is in a position where orifice 144, which is initially blocked and not visible in FIG. 3a, is on the left, i.e., at 180°, and orifice 146 is on the right, i.e., at 0°. Left orifice seal or blocking member 170 is centrally positioned or position elsewhere so as not to impede either orifice 134 or 136 on left rotational member 130. Right blocking member 172 is positioned to block the orifice 144 at 180° to prevent the extrusion of dough therefrom. Accordingly, at this stage, strand A is extruded through orifice 134, strand B is extruded through orifice 136, and strand C is extruded through strand C. It should be noted that throughout the sequential movements of the rotational members and blocking members, pressurized dough is continuously being extruded through the three open orifices which are unblocked at any given time.

Figure 3B:
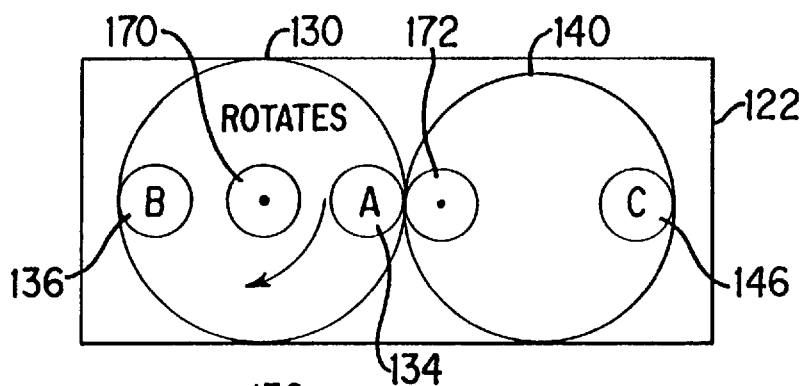

In sequence no. 2, as shown in FIG. 3b, the left rotational member 130 rotates clockwise 180°, to swing orifice 134 from 180° to 0°, and to swing orifice 136 from 0° to 180°. This causes strand B to twist with, and more specifically to cross on top of, strand A. Right rotational member 140 is held stationary and strand C continues to be extruded through orifice 146.

Figure 3C:
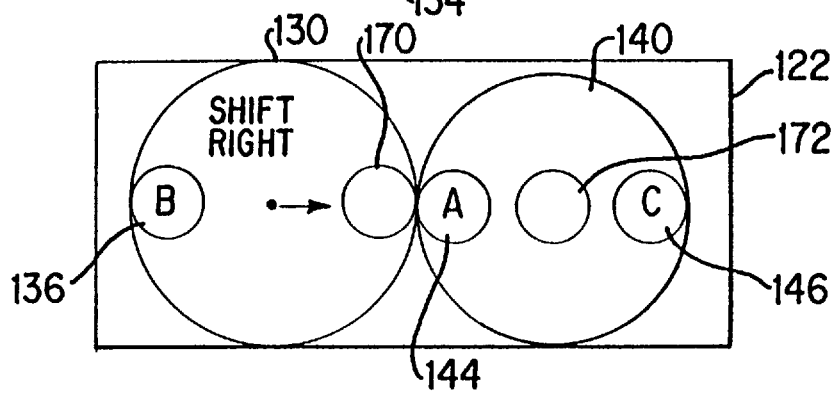

The orifice seals 170 and 172 shift toward the right in FIG. 3c, sequence no. 2a, so that orifice seal 170 blocks orifice 134 and orifice seal 172 opens or "unblocks" orifice 144. This causes strand A to translate from orifice 134 on left rotational member 130 to orifice 144 on right rotational member 140.

As will be explained in detail hereinafter with reference to FIGS. 4–10, a strand moves from one adjacent orifice to the other, i.e., between 0° on the left rotatable disc and 180° on the right rotatable disc, by either (i) gradually merging and shifting (FIGS. 4–6) or (ii) severing, translating, and uniting (FIGS. 6–10).

Figure 3D:
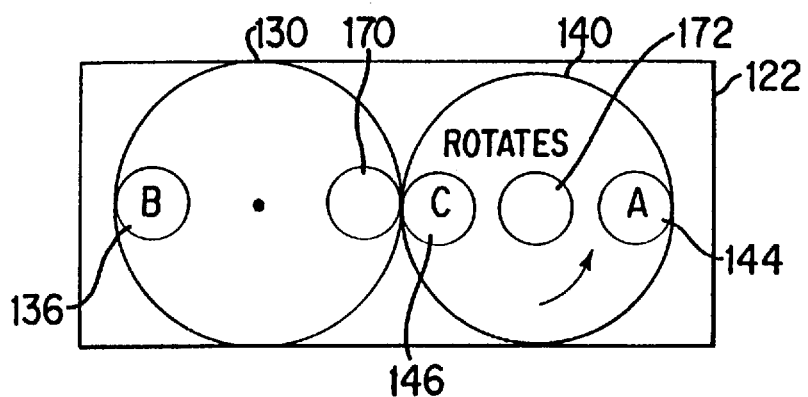

Right rotational member 140 rotates counter-clockwise 180°, as shown in FIG. 3d, sequence no. 3, which effectively causes strand C to twist with, and more specifically to cross on top of, strand A. Orifice 134 on left rotational member 130 remains blocked by orifice seal 170 and strand B continues to be extruded through orifice 136 at 180° on left rotational plate 130.

Figure 3E:
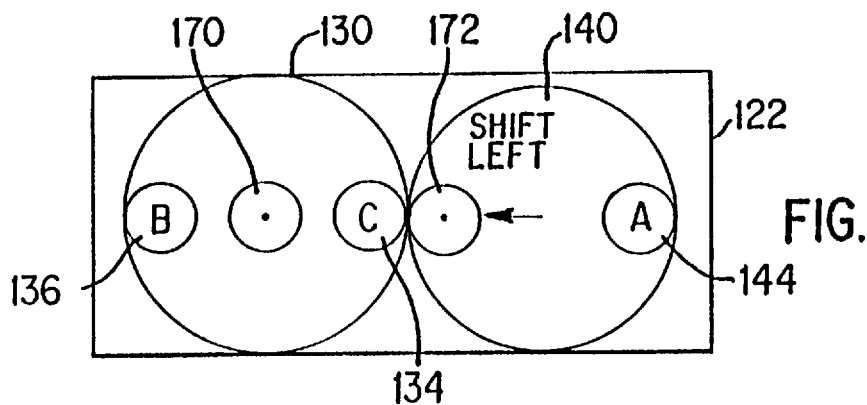

In FIG. 3e, sequence no. 3a, orifice seals 170 and 172 shift toward the left, so that orifice seal 172 blocks orifice 146, and orifice seal 170 opens or "unblocks" orifice 134, in a manner as previously described.

Figure 3F:
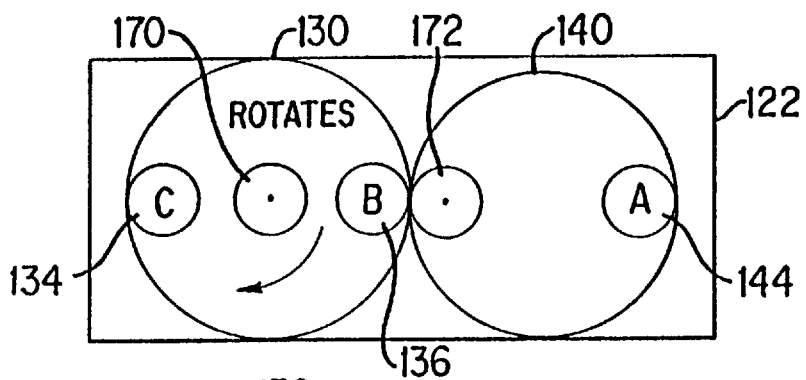

In FIG. 3f, sequence no. 4, left rotational member 130 again rotates clockwise 180° which causes strand C to cross on top of strand B, rotationally displacing orifice 134 clockwise from 0° to 180°, and orifice 136 from 180° to 0°. Right rotational member 140 is held stationary and strand A continues to be extruded through orifice 146.

Figure 3G:
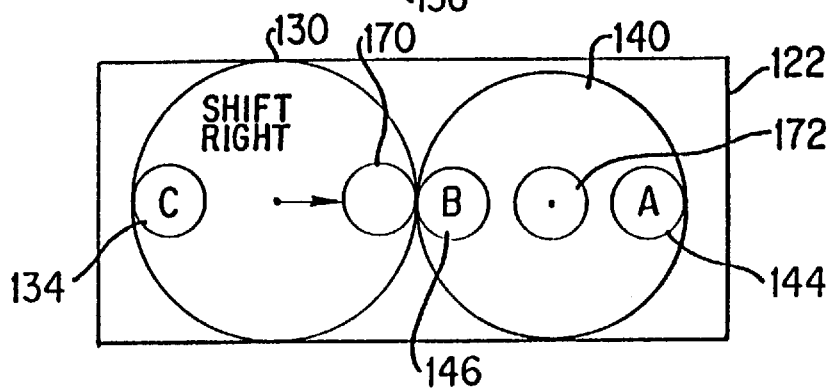
Figure 3H:
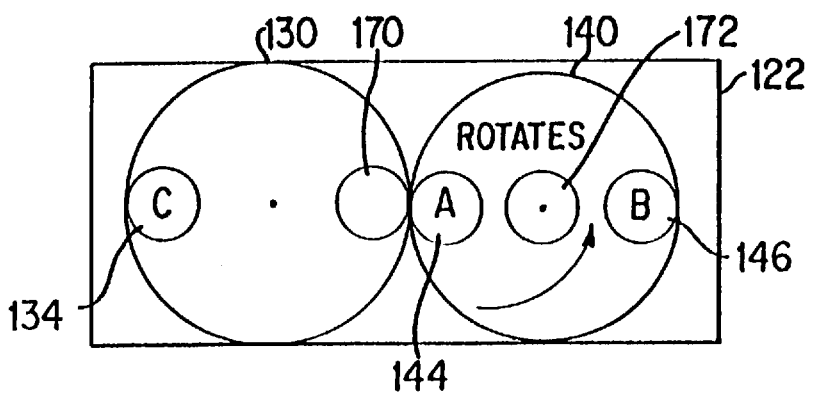
Figure 3I:
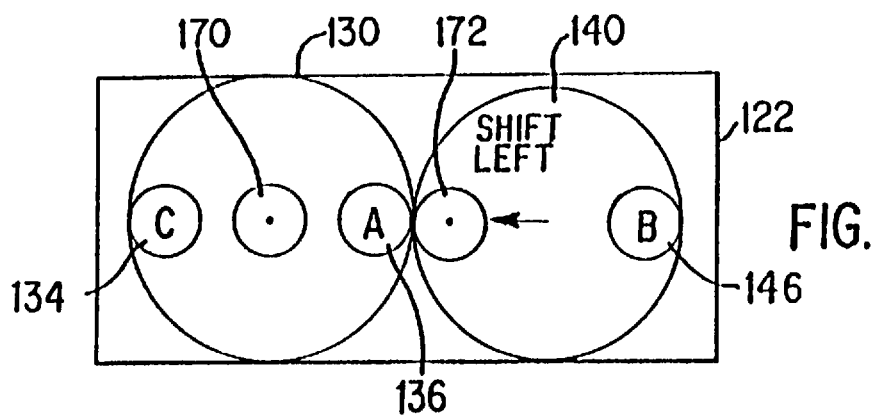
Figure 3J:
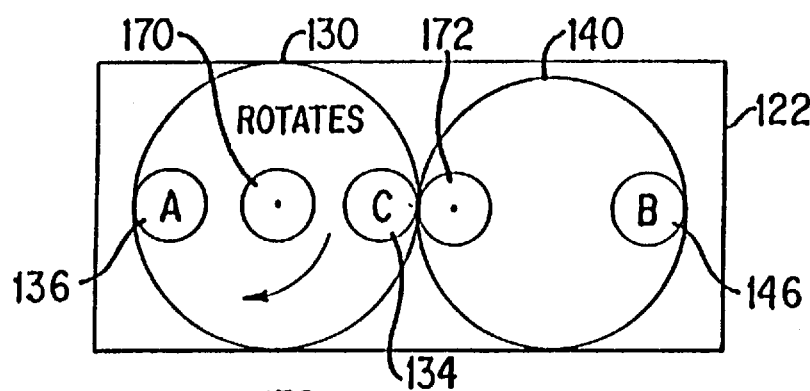
Figure 3K:
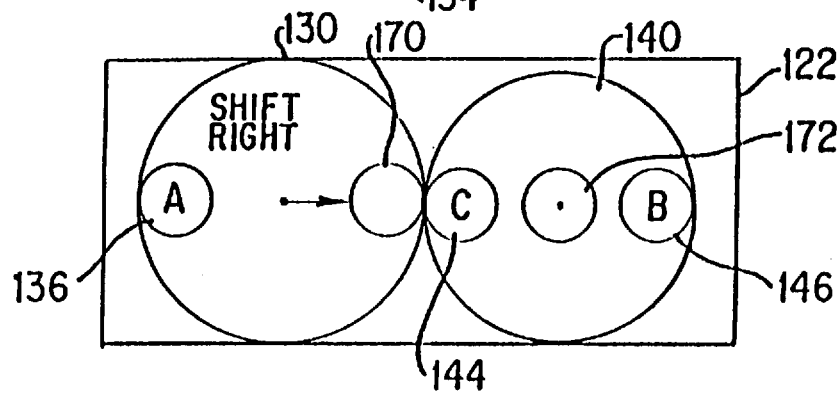
Figure 3L:
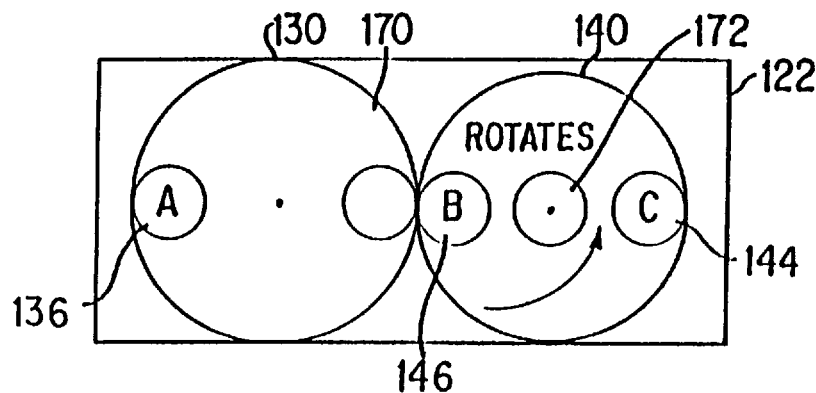

The orifice seals 170 and 172 shift again toward the right in FIG. 3g, sequence no. 4a, so that orifice seal 170 blocks orifice 136 and orifice seal 172 opens or "unblocks" orifice 146. This causes strand B to shift from being extruded from orifice 136 on left rotational member 130 to orifice 146 on right rotational member 140.

As can be seen in FIGS. 3h–3l, sequence nos. 5–7, the pattern of (a) rotate left rotational member 130 clockwise, (b) transfer the strand at 0° on left rotational plate 130 to 180° on right rotational plate 140, e.g., shift orifice seals 170 and 172 to the right, (c) rotate right rotational member 140 counter-clockwise, and (d) transfer the strand at 180° on right rotational plate 140 to 0° on left rotational plate 130, e.g., shift orifice seals 170 and 172 to the left, continues to move the three strands in a substantially figure-eight-shaped pattern and form a classic three-strand braid.

Details of three braiding extruder embodiments are respectively shown in FIGS. 4 and 5, FIG. 6, and FIGS. 7–10. It should be noted that with respect to FIG. 4, the right rotatable member appears on the left and the left rotatable member appear on the left, as these figures view the rotatable members from a side opposite from the views shown in FIGS. 1, 3a–3l, and 6, 7, and 10.

Figure 4:
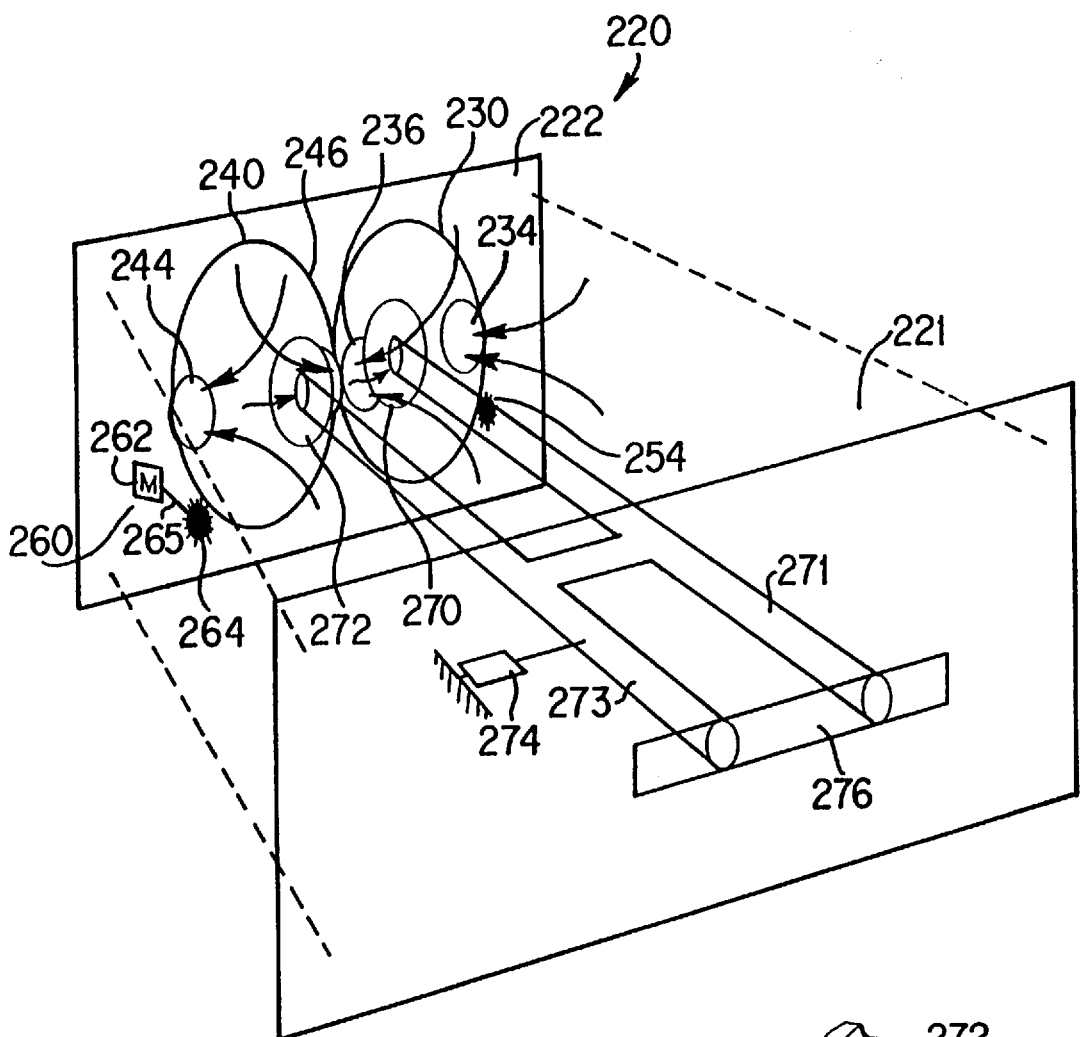
FIG. 4 illustrates a supply-side perspective view of a first braiding extruder embodiment of the present invention.
Figure 5:
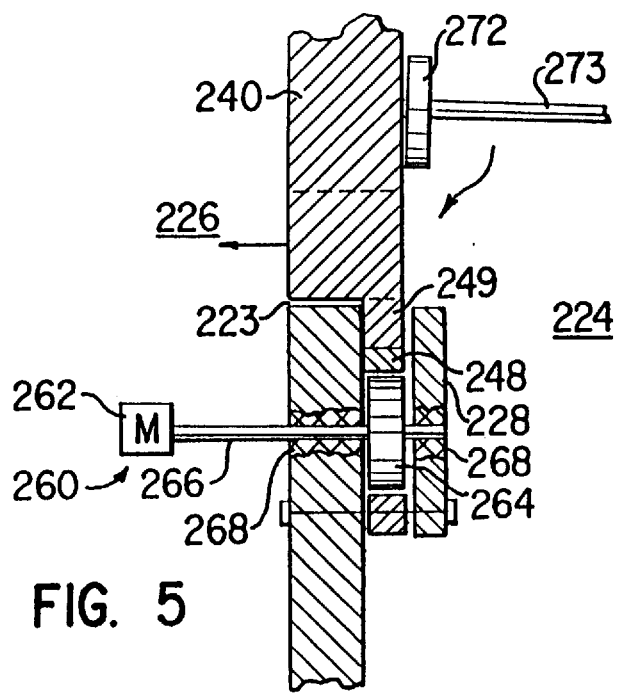
FIG. 5 is cross-sectional view through the extrusion block of the braiding extruder of FIG. 4, illustrating the drive system for a rotatable die member.

FIGS. 4 and 5 show a first braiding extruder 220 of the present invention. Extruder 220 includes an extrusion manifold 221 connected to a supply of pressurized extrusible material, and an extrusion block 222 with a figure-eight-shaped cutout 223. Rotational die members take the form of rotatable plates or disks 230 and 240. Each disk 230 and 240 includes two voids, holes, apertures, or orifices therein, respectively designated by reference numerals 234 and 236, and 244, and 246. Further, disks are rotatable about a parallel axes, and are alternately driven in opposite directions by respective drive systems which include a toothed drive gear 254 and 264 coupled respective a motor 252 and 262. One arrangement for such a coupling is shown in FIG. 5.

Referring to FIG. 5, a rotatable disk 240 is shown having orifice 244, and teeth 248 on a stepped periphery 249. The stepped periphery 249 facilitates retaining and rotating disk 240 with respect to extrusion block 222. One or more disc retaining members 228 may be attached to block 222 to help retain and align disc 240 within recess. Drive gear 264 is coupled to motor 262 via a drive shaft 266 and bearings 268. Additional power transfer coupling devices may also be used. In the preferred arrangement, motor 262 is on the discharge side 226 of block 222. However, it is recognized that motor 224 could also be located on the supplied side 224 of block 222 in an appropriately sealed casing.

Two orifice sealing members, e.g., sealing plates 270 and 272 are positioned on the inlet side of the orifices and are sized to be slightly larger that the size of the orifices to totally block an orifice and prevent the extrusion of the dough therefrom. The side of the sealing plates 270 and 272 adjacent the dough supply includes a respective control rod 271 and 273 extending rearwardly therefrom. Rods 271 and 273 are driven laterally with respect to block 222 so one of the two sealing plates 270 and 272 opens a blocked orifice and the other blocks an open orifice. Rods 271 and 273 may be joined to create a single frame and driven together by a single piston and cylinder assembly 274 as shown, or may be separate from one another and independently shifted. A guiding slot 276 may be used to keep the rods 271 and 273 the orifice sealing plates 270 and 272 in better alignment.

In FIG. 4, the braiding extruder is shown in a position in which a strand of dough is being shifted from the right disk 240 to the left disk 230. The orifice blocking plate 272 on the right rotatable member 240 moves towards the left disk 230 to block orifice 246 and prevent the extrusion therethrough. Simultaneously, orifice blocking plate 270 on the left rotatable member 230 moves towards its center to unblock or open orifice 236 and permit the extrusion therethrough. Since the orifice blocking plates 270 and 272 are shifting simultaneously by piston and cylinder assembly 274, the strand shifts from (i) being totally extruded through orifice 246, to (ii) varying positions in which the dough is being extruded the adjacent portions of the orifices 246 and 236 and merge to both contribute to the extruded strand, to (iii) being totally extruded through unblocked orifice 236.

With respect to the orifices 234, 236, 244, and 246, cut into disks 230 and 240, it is preferable that they are cut in such a manner to leave a portion of the circumference of the disks 230 and 240 cut away. Ideally, if the orifices are circular, they will be cut offset such that up to approximately 70° of each orifice would be missing. This allows for the dough to smoothly transfer from one rotational member to the other, by flowing across the missing perimeter sections, when the valves are synchronously moved.

Figure 6:
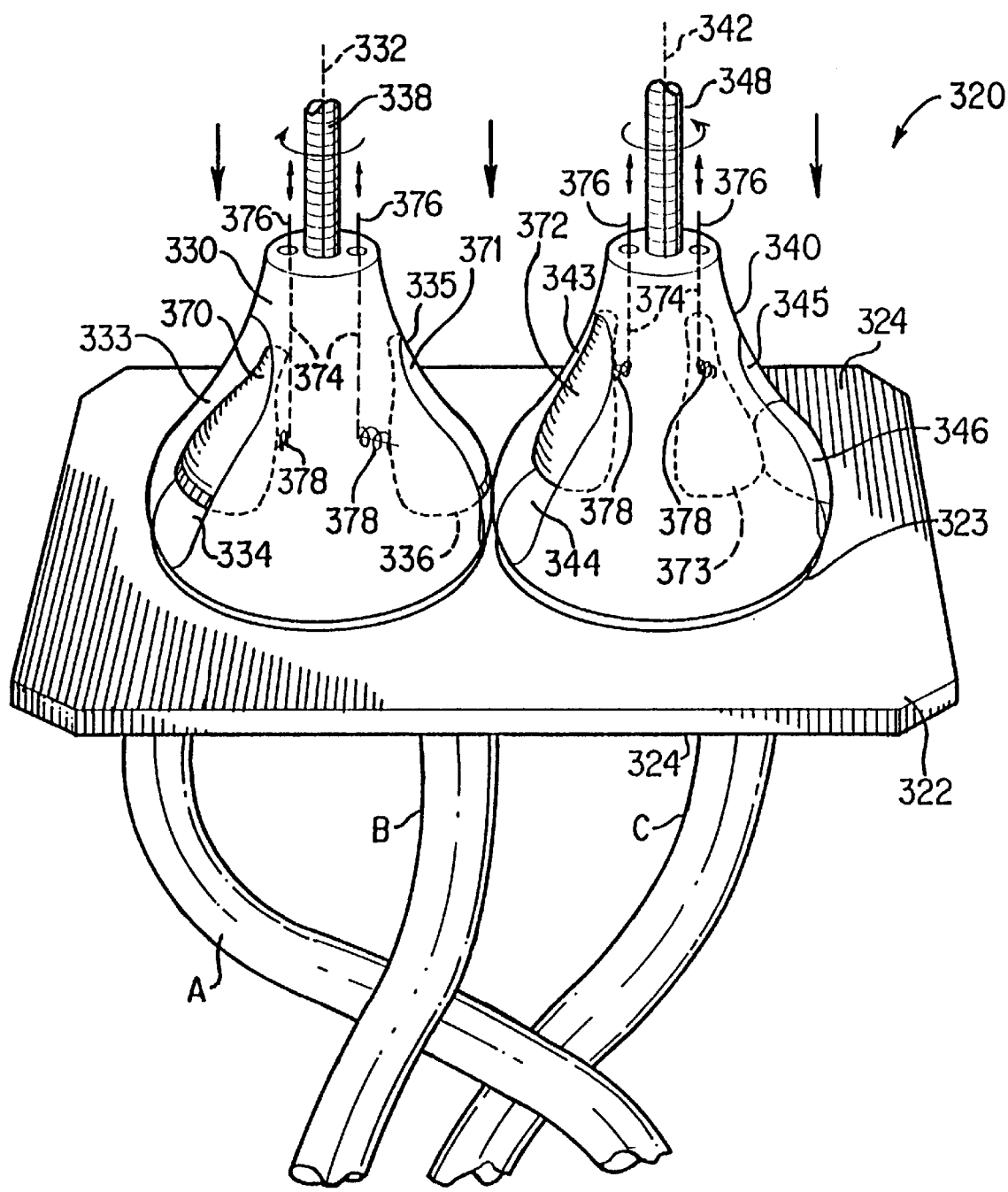
FIG. 6 is an upper supply-side perspective view of a second braiding extruder embodiment of the present invention.

FIG. 6 shows a second braiding extruder 320 of the present invention. As with the first embodiment, extruder 320 includes an extrusion manifold connected to a supply of pressurized dough, and an extrusion block 322 with a figure-eight-shaped cutout 323. Rotational die members take the form of cone shaped members 330 and 340. Each cone 330 and 340 includes two internal sleeves respectively designated by reference numerals 333 and 335, and 343 and 345, each formed by tapered cutouts. The bottom of each of the sleeves includes a hole 334 and 336, and 344 and 346 which extrudes dough therethrough when unblocked.

With respect to the cutout sleeves forming holes 334, 336, 344, and 346, in a manner similar to the orifices 234, 236, 244, and 246 cut into disks 230 and 240, it is preferable that they are cut in such a manner to leave a portion of the circumference of the cones 330 and 340 cut away to allow for the dough to smoothly transfer from one rotational member to the other, by flowing across the missing perimeter sections, when the valves are synchronously moved. However, the shape of the orifices along the length of the sleeves, as well as the lateral sides of the boots, may by linear to produce a better seal when closed.

As with the other embodiments, cone blocks 330 and 340 are rotatable about a parallel axes, and are alternately driven in opposite directions by respective drive systems. The drive systems for cones 330 and 340 include motors, not shown, each coupled to a centrally mounted shaft 338 and 348 for rotating the cones.

Boot valves are formed by the tapered cutouts and by radially sliding hole blocking members or boots 370–373. The boots 370–373 block the flow of the dough through their respective hole 334 and 336, and 344 and 346 when extended, and permit the extrusion of the dough through their respective hole when retracted. Boots can be extended and retracted by many different devices, and are preferably spring biased into either the extended or the retracted position, and positively driven towards the other position. In a preferred embodiment as illustrated in FIG. 6, boots 370–373 are biased into their extended position by springs 378, and positively driven into their retracted position by a respective block driving device 374. Block driving device 374 can include any individual or combination of elements which translates vertical movement of one element into horizontal movement of the boot. For example, block driving device 374 can include a vertical rod 376 extending down through a bore in the cone, and coupled to the boot in a manner in which the vertical translation of vertical rod 376 is translated to the retraction and/or the extension of the boot. However, other boot driving devices could also effectively be used. Further, a camming system is preferably used so that the boot automatically mechanically extends and/or retracts in response to rotations of the cones 330 and 340. However, regardless of the specific boot drive arrangement used, the drive system for each boot should be coordinated for simultaneous or substantially simultaneous opening and closing of the adjacent boot valves to transfer strands between the cones by merging the flows during the shifting process of the boots.

Figure 10:
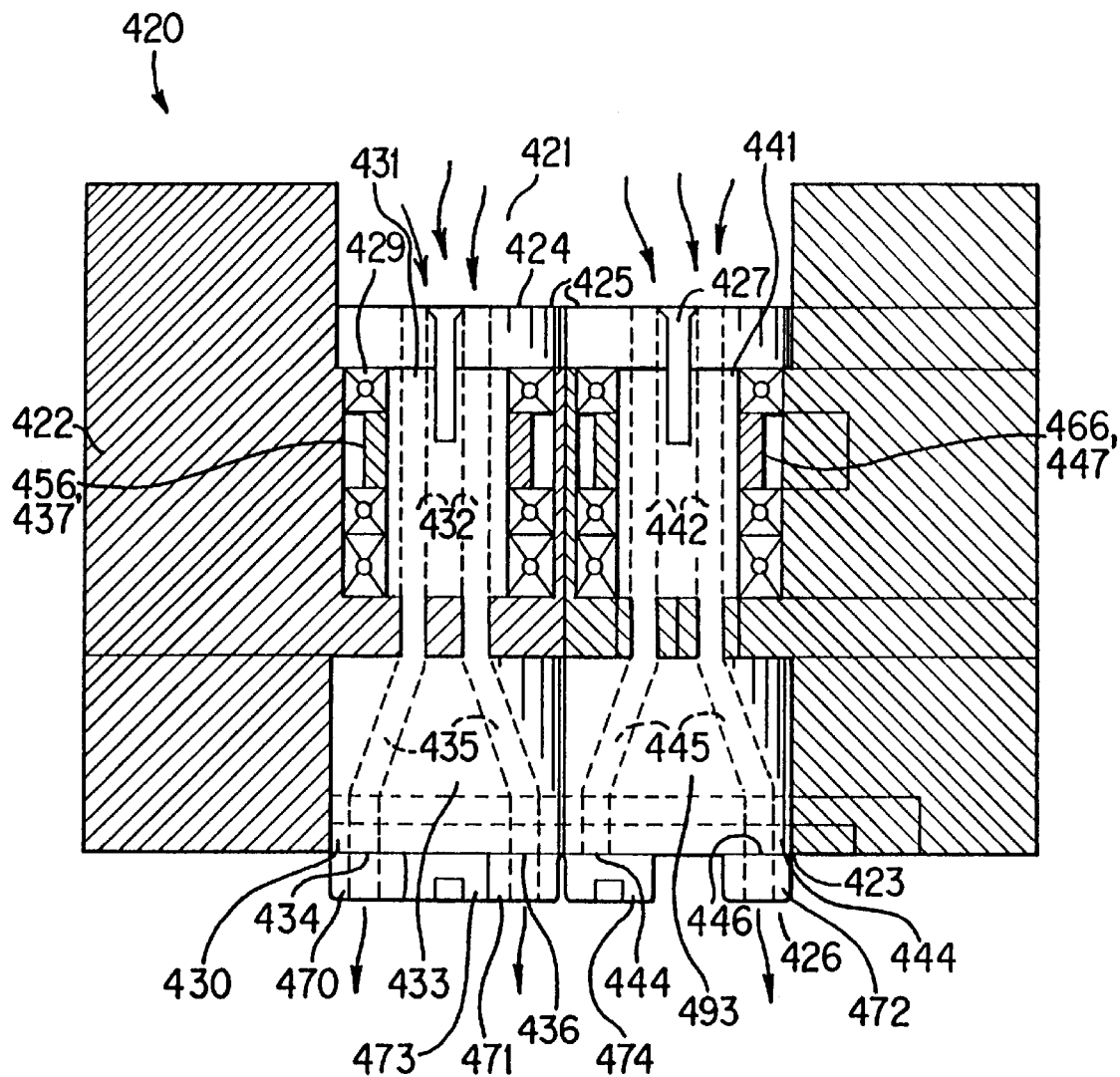
FIG. 10 is a top view of the braiding extruder of FIG. 7.

FIGS. 7–10 show a third braiding extruder 420 of the present invention. Braiding extruder 420 includes an extrusion block 422, having a cutout figure eight section 423, a supply side 424, and a discharge side 426. Rotatable die members 430 and 440 are rotatably mounted within extrusion block 422 to rotate in opposite directions around parallel axes. As seen in FIG. 10, each rotatable die member 430 and 440 includes a supply-side narrow cylindrical portion 431 and 441, and a discharge-side widened portion 433 and 443. Supply-side narrow portion 431 and 441 includes a pair of inwardly disposed dough extrusion conduits or paths 432 and 442 therein which extend from extrusion supply 421 to dough extrusion conduits or paths 435 and 445 on discharge-side widened portion 433 and 443. Dough extrusion paths 435 and 445 progressively extend away from the axis of rotation of its rotatable member terminating at orifices 434 and 436, and 444 and 446, at the discharge portion of the rotatable members adjacent the circumference.

An end cap 425 may be mounted at the rear of each rotatable member to provide a spindle 427 for the rotation of the rotatable member. End caps 425 include holes cut therein to permit dough to flow from the extrusion supply 421 into dough extrusion paths 432 and 442. Additionally, if desired, each end cap 425 may be configured to mate with a conduit supplying the dough thereto.

Rotatable members 430 and 440 are respectively driven by a driving system 450 and 460, each which includes a motor 452 and 462, a drive gear 454 and 464, and a toothed belt 456 and 466. As shown in FIG. 10, notches on belts 456 and 466 interface with toothed gears 437 and 447 on the rotational die members 430 and 440, so rotating a drive gear 454 and 464 will rotate its respective rotatable member 430 and 440, via belt 456 and 466. Bearings 429 and 439 located on both sides of the belts are preferably used to facilitate the rotation of die members 430 and 440 and extend their operational life.

The front portion of each rotatable die 430 and 440 includes a diametric guide track 439 and 449 located therein. A set of sliding blocks slide within diametric guide tracks 439 and 449 to selectively block or permit flow through the orifices. As illustrated in FIGS. 7–9, the set of sliding blocks include three nozzle blocks 470–472 and two flow blocking blocks 473 and 474. Nozzle blocks 470–472 include a dough path therein 478 permitting dough to pass from dough extrusion paths 435 and 445, and the orifices associated therewith, i.e., the end of the paths, to be discharged out the front of the nozzle block. Flow blocking blocks 473 and 474 prevent the flow of dough from exiting dough extrusion paths 435 and 445, when positioned in front of an orifice. Nozzle blocks 470–472 and flow blocking blocks 473 and 474 include guiding portions 475 and 476 on the rear thereof for travelling along and sliding within diametric guide tracks 439 and 449. While guide tracks 439 and 449 and guiding portions are preferably rectangular in shape, they may take any shape provided that they are substantially complementary to guide the blocks 470–474 and retaining them within the rotatable members 430 and 440.

Nozzle blocks 470–472 and flow blocking blocks 473 and 474 are pushed into their desired positions by a block pushing system which includes opposing piston cylinders 490 fixedly coupled to upper and lower push rods 492 and 493, via stop plate 491. The distal tips of push rods 492 and 493 abut upper and lower projections 481 and 482 on flow blocking blocks 473 and 474 to slide the blocks within the tracks. A guiding and stop block 495 has two holes therein for providing precise alignment between the push rods and the upper and lower projections 481 and 482 on flow blocking blocks 473 and 474. Further, the face of guiding and stop block 495 is toleranced with stop plate 491 so that stop plate 491 hits guiding and stop block 495 before an over-travel of the push rods can damage the blocks or affect the operation of braiding extruder 420.

In operation, the flow of dough extends from the dough supply, through the dough paths in the rotatable members and is discharged out of the three of the four orifices, with the fourth orifice being blocked by one of the flow blocking blocks 473 or 474. As in the operation of the previous embodiments, this embodiment follows the same pattern of rotating the alternately rotating the rotatable die members in 180° increments in opposite direction, pausing between incremental rotations to transfer a strand of dough from an open orifice to an adjacent closed orifice. However, instead of transferring the strand by merging the flows, the strand is severed from the open orifice as it is being closed, and is attached to material being extruded from the adjacent orifice as it is being open.

As shown in FIG. 7, the left rotatable member 430 contains one nozzle block 470 and the right rotatable member 440 contains two nozzle blocks 471 and 472. Each rotatable member 430 and 440 will always contain one flow blocking block 473 or 474. Thus, in the sequence shown in FIG. 7, one strand will be extruded from 180° on left rotatable member 430 and two stands will be extruded through the right rotatable member 440. The strand extending from orifice 444, i.e., 180° on the right rotatable member 440, is transferred to 0° on the left rotatable member 430, by the actuation of the cylinder unit 490 on the right side of extruder 420. Cylinder 490 extends push pods 492 and 493 into upper and lower projections 481 and 482 on flow blocking block 474, with the sides 479 and 480 of the blocks bearing upon each other. The cylinder unit 490 retracts the rods 492 and 493 upon the completion of the stroke to avoid interfering with a subsequent rotation of right rotatable member 440. The rods 492 and 493 push blocks 474, 471, and 473 toward the left, to the position shown in FIG. 10, such that flow blocking block 474 is blocking the flow from orifice 444, and nozzle block 471 is permitting the flow from orifice 436. As nozzle block 471 moves from the guide track on the right rotatable member to the guide track on left rotatable member, it severs the strand from its orifice 444. However, upon immediate positioning in front of orifice 436, the flow of dough from orifice 436 unites and attaches to the severed end of the strand in end-to-end fashion so that the strand is continuous once again. Following this uniting, the left rotatable member 430 is rotated 180°, and the pattern as shown in FIGS. 3a–3l is continued. It should be noted that while this uniting process works on many doughs for food products due to their consistency, some extrusible materials having a different consistency may not effectively reunite.

It is apparent that with the embodiment shown in FIGS. 7–10, the three strands always remain with a respective nozzle block 470–472. This provides the capability of having strands of different cross sections in a single product by having different shaped dough path outlets 478. Further, nozzle blocks 470–472 can have flow paths which split or fork so that each strand may be comprised of two or more "substrands".

While all the embodiments shown herein include two rotatable die members and three strands, more than two rotatable die members could be used to produce products having more than three braided strands. If desired, the number of rotatable die members and strands would be theoretically unlimited. However, the relationship between the number of rotatable members and strands would still preferably be S=N+1, where N is the number of strands and N is the number of rotatable die members. In such an arrangement, the rotating step would consist of rotating every other rotatable die member in one direction.

Further, the braiding extruder could easily be designed so that multiple extrusion and braiding lanes can be arranged side-by-side in parallel and be connected to the same extruder manifold/source.

It should also be recognized that this invention is not limited to food doughs and an unlimited number of extrusible materials, e.g., soaps, nylons, plastics, etc., could be used.

While particular embodiments of the invention have been shown and described, it is recognized that various modifications thereof will occur to those skilled in the art. Additionally, it is apparent that the drive systems for rotating members, the valving systems, and other systems associated with one of the embodiments may be usable with another of the embodiments. Therefore, the scope of the herein-described invention shall be limited solely by the claims appended hereto.

What is claimed is:

1. An apparatus for making braided products from extrusible material, said apparatus comprising:

a first rotatable member, said first rotatable member includes a first orifice means for extruding a strand of extrusible material therethrough and a second orifice means for extruding a strand of extrusible material therethrough;

a second rotatable member, said second rotatable member includes a third orifice means for extruding a strand of extrusible material therethrough and a fourth orifice means for extruding a strand of extrusible material therethrough;

each of said orifice means fluidly coupled to a source of pressurized extrusible material;

driving means for rotating said first rotatable member clockwise about a first axis of rotation and for rotating said second rotatable member counter-clockwise about a second axis of rotation, said second axis of rotation being parallel to the first axis of rotation; and movable orifice blocking means for selectively permitting and preventing the extrusion of the extrusible material from said first, second, third, and fourth orifice means;

wherein said driving means, each said orifice means, and said movable orifice blocking means extrude and braid at least three strands of extrusible material.

2. The apparatus of claim 1, wherein each said orifice means includes an inlet side in which the extrusible material enters and an outlet side in which the extrusible material exits, said movable orifice blocking means being located on the inlet sides of the orifice means.

3. The apparatus of claim 2, wherein said movable orifice blocking means includes a first blocking element, a second blocking element, and blocking element driving means for moving the first blocking element to selectively block and unblock said first and said second orifice means and for moving the second blocking element to selectively block and unblock said third and said fourth orifice means.

4. The apparatus of claim 3, wherein said blocking element driving means includes a piston and cylinder assembly coupled to said first and second blocking elements.

5. The apparatus of claim 2, wherein said movable orifice blocking means includes a first blocking element, a second blocking element, a third blocking element, and a fourth blocking element, said first, second, third, and fourth movable blocking elements being selectively movable to permit and prevent the flow of extrusible material from said first, second, third, and fourth orifice means.

6. The apparatus of claim 5, further comprising blocking element driving means for moving said blocking elements between an open position in which the extrusible material is permitted to be extruded through its respective orifice means, and a closed position in which the extrusible material is prevented from being extruded through its respective orifice means.

7. The apparatus of claim 6, wherein said blocking element driving means includes a biasing devices biasing the blocking elements into their closed position.

8. The apparatus of claim 6, wherein each said blocking element rotates with the rotatable member associated with its respective orifice means.

9. The apparatus of claim 1, wherein each said orifice means includes an inlet side in which the extrusible material enters and an outlet side in which the extrusible material exits, said movable orifice blocking means being located on the outlet sides of the orifice means.

10. The apparatus of claim 9, wherein said first and second rotatable members each include a diametric guide track, said movable orifice blocking means includes a plurality of shiftable nozzles movable within the guide tracks on the first and second rotatable members.

11. The apparatus of claim 10, said movable orifice blocking means further includes a piston and cylinder assembly for shifting the nozzles along an axis perpendicular to the first and second axes of rotation and between the rotatable members.

12. The apparatus of claim 1, wherein each said first and second rotatable members includes gearing teeth located on a circumferential periphery thereof.

13. The apparatus of claim 12, wherein said driving means for the rotatable members includes drive gears which intermesh with the teeth on the rotatable members.

14. The apparatus of claim 12, wherein said driving means for the rotatable members includes driven toothed belts which intermesh with the teeth on the rotatable members.

15. The apparatus of claim 1, wherein said first and second rotatable members each include a shaft extending therefrom, said shafts being coaxial with the axis of rotation of their respective rotatable member, said driving means for the rotatable members being coupled to said shafts.

16. The apparatus of claim 1, further comprising a controller, said controller controls the driving means for the rotatable members so that said rotatable members are alternatively driven.

17. The apparatus of claim 16, wherein said controller further controls the drive means for the rotatable members to include delay periods between the alternate driving of the rotatable members, and further controls the movable orifice blocking means to always and only move the movable orifice blocking means during said delay periods to (i) unblock a blocked orifice means on one of the rotatable members to permit extrusible material to be extruded therethrough, and (ii) block an unblocked orifice means on the other rotatable member to prevent extrusible material from be extruded therethrough.

18. An apparatus for making a product with at least one strand from an extrusible material, said apparatus comprising:
  a first rotatable member, said first rotatable member includes at least one passageway, and is rotatable around a first axis of rotation;
  a first valve, said first valve having an open condition in which the extrusible material is extruded in a strand through the passageway on the first rotatable member, and a closed condition in which the extrusible material is prevented from being extruded through the passageway on the first rotatable member;
  a second rotatable member, said second rotatable member includes at least one passageway, and is rotatable around a second axis of rotation, said second axis of rotation being parallel to, and spaced from, the first axis of rotation;
  a second valve, said second valve having an open condition in which the extrusible material is extruded in a strand through the passageway on the second rotatable member, and a closed condition in which the extrusible material is prevented from being extruded through the passageway on the second rotatable member; and
  a controller for closing the first valve and opening the second valve, wherein a strand being extruded through the passageway on the first rotatable member is transferred to the passageway on the second rotatable member for continued extrusion thereof.

19. The apparatus of claim 18, wherein the controller substantially synchronously closes said valve on the first rotatable member and opens the valve on the second rotatable member, which merges and shifts the strand from the first rotatable member to the second rotatable member to continuously form the strand without interruption.

20. The apparatus of claim 18, wherein the controller opens the second valve substantially immediately after it closes the first valve in a manner which cuts the strand from the passageway in the first rotatable member, transfers the cut strand to the passageway in the second rotatable member, and unites the cut strand end-to-end with extrusible material being extruded through the passageway of the second rotatable member, to form a continuous strand.

21. An apparatus for making a braided product from extrusible material, said apparatus comprising:
  four outlet ports fluidly coupled to a source of pressurized extrusible material, said outlet ports being selectively opened and closed for extruding exactly three strands of the extrusible material therethrough; and
  means for moving the three strands in a substantially figure-eight-shaped pattern to braid the strands.

22. The apparatus of claim 1, wherein said extrusible material is dough and said apparatus makes edible braided products.

23. The apparatus of claim 1, wherein said movable orifice blocking means selectively permits the extrusion of extrusible material from exactly three of said first, second, third, and fourth orifice means at any given time.

24. The apparatus of claim 1, wherein said driving means, each said orifice means, and said orifice blocking means extrude and braid a number of strands from a number of rotatable members and the number of strands equals the number of rotatable members plus one.

25. The apparatus of claim 18, wherein said extrusible material is dough and said apparatus makes edible products.

26. The apparatus of claim 21, wherein said extrusible material is dough for forming an edible braided product.

* * * * *